(12) United States Patent
Tadakuma

(10) Patent No.: US 9,777,449 B2
(45) Date of Patent: Oct. 3, 2017

(54) STRUCTURAL OBJECT FOR ROAD AND ROAD STRUCTURE HAVING THE SAME

(71) Applicant: TOYOTA JIDOSHA KABUSHIKI KAISHA, Toyota-shi (JP)

(72) Inventor: Kenji Tadakuma, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/189,278

(22) Filed: Jun. 22, 2016

(65) Prior Publication Data

US 2017/0030037 A1  Feb. 2, 2017

(30) Foreign Application Priority Data

Jul. 31, 2015  (JP) .................. 2015-152585

(51) Int. Cl.
| | | |
|---|---|---|
| *E01F 15/00* | (2006.01) | |
| *E01F 15/08* | (2006.01) | |
| *E01F 7/02* | (2006.01) | |
| *E01F 7/06* | (2006.01) | |
| *F03D 3/00* | (2006.01) | |

(52) U.S. Cl.
CPC ................ *E01F 15/08* (2013.01); *E01F 7/02* (2013.01); *E01F 7/06* (2013.01); *F03D 3/005* (2013.01)

(58) Field of Classification Search
CPC ................... E01F 15/08; F03D 3/005
USPC ........................................... 404/6, 9
See application file for complete search history.

(56) References Cited

U.S. PATENT DOCUMENTS

| 2,985,976 | A | * | 5/1961 | Parker ..................... | F03D 3/065 |
|---|---|---|---|---|---|
| | | | | | 116/DIG. 7 |
| 3,349,674 | A | | 10/1967 | Hutwelker | |
| 3,374,763 | A | * | 3/1968 | Browning ............... | E01F 13/02 |
| | | | | | 116/63 P |
| 4,353,179 | A | * | 10/1982 | Jennings ................... | G09F 7/22 |
| | | | | | 40/431 |
| 5,181,695 | A | | 1/1993 | Arthur | |
| D342,036 | S | * | 12/1993 | Rushing .................. | E01F 13/02 |
| | | | | | D10/109.1 |
| 5,613,799 | A | * | 3/1997 | Guide ...................... | G09F 13/16 |
| | | | | | 40/412 |

(Continued)

FOREIGN PATENT DOCUMENTS

| BE | 1015244 A3 | 12/2004 |
|---|---|---|
| JP | 2005-307431 | 11/2005 |

(Continued)

*Primary Examiner* — Raymond W Addie
(74) *Attorney, Agent, or Firm* — Oblon, McClelland, Maier & Neustadt, L.L.P.

(57) ABSTRACT

A wind break having a blade is mounted between an inbound lane and an outbound lane, which is the opposite lane of the inbound lane. The blade has a back surface facing the same direction as an inbound traveling direction and a front surface facing the same direction as an outbound traveling direction. The back surface has a concave part that is concave in the same direction as the outbound traveling direction in order to change wind blowing from the outbound lane into wind having a component of the inbound traveling direction. The front surface has a concave part that is concave in the same direction as the inbound traveling direction in order to change wind blowing from the inbound lane into wind having a component of the outbound traveling direction.

15 Claims, 13 Drawing Sheets

(56) References Cited

U.S. PATENT DOCUMENTS

| 5,953,841 | A | * | 9/1999 | Sawyer | G09F 7/22 40/124.191 |
|---|---|---|---|---|---|
| 2007/0059097 | A1 | * | 3/2007 | Chen | B60L 8/00 404/71 |
| 2008/0150296 | A1 | * | 6/2008 | Fein | F03D 9/002 290/1 R |

FOREIGN PATENT DOCUMENTS

| JP | 2010-163850 | 7/2010 |
|---|---|---|
| JP | 2010-248959 | 11/2010 |
| JP | 2011-99330 | 5/2011 |

\* cited by examiner

STRUCTURAL OBJECT FOR ROAD AND ROAD STRUCTURE HAVING THE SAME

CROSS-REFERENCE TO RELATED APPLICATIONS

This application is based upon and claims the benefit of priority from Japanese patent application No. 2015-152585, filed on Jul. 31, 2015, the disclosure of which is incorporated herein in its entirety by reference.

BACKGROUND OF THE INVENTION

1. Field of the Invention

The present invention relates to a structural object to be built on a road and a road structure having the same.

2. Description of Related Art

Japanese Unexamined Patent Application Publication No. 2010-163850 discloses a windbreak wall that is built along a road. This windbreak has a plurality of louvers arranged along the road. The louvers are placed so that the side of each louver in the vehicle traveling direction is inclined inward and the site opposite to the vehicle traveling direction is inclined outward. In this structure, while wind blowing on a vehicle obliquely from the front and from the sides is suppressed, wind blowing on the vehicle obliquely from the back and from the back passes through, thereby contributing to reduction of fuel consumption of the vehicle.

However, the above-described technique does not improve the fuel efficiency of another vehicle with utilization of wind generated by traveling of a vehicle.

An object of the present invention is to provide a technique to improve the fuel efficiency of another vehicle with utilization of wind generated by traveling of a vehicle.

SUMMARY OF THE INVENTION

According to a first aspect of the present invention, a structural object for road to be mounted between a first lane and a second lane being an opposite lane of the first lane includes a first wall surface facing the same direction as a traveling direction of the first lane, and a second wall surface facing the same direction as a traveling direction of the second lane, wherein the first wall surface has a concave part that is concave in the same direction as the traveling direction of the second lane in order to change wind blowing from the second lane into wind having a component of the traveling direction of the first lane, and the second wall surface has a concave part that is concave in the same direction as the traveling direction of the first lane in order to change wind blowing from the first lane into wind having a component of the traveling direction of the second lane. In this structure, it is possible to improve the fuel efficiency of an oncoming vehicle with utilization of wind generated by traveling of a vehicle.

In another aspect, the first wall surface contains a flat surface and a curved surface in order from the second lane to the first lane, and the second wall surface contains a flat surface and a curved surface in order from the first lane to the second lane. In this structure, it is possible to change wind blowing from the second lane into wind having a component in the traveling direction of the first lane more efficiently than the case where the first wall surface is composed of a combination of a plurality of flat surfaces. Likewise, it is possible to change wind blowing from the first lane into wind having a component in the traveling direction of the second lane more efficiently than the case where the second wall surface is composed of a combination of a plurality of flat surfaces.

In another aspect, the above-described structural object for the road has a first curved plate that is curved to be convex toward the traveling direction of the second lane in a plan view, a flat plate that is inclined toward the traveling direction of the first lane in the plan view as it goes from the first lane to the second lane, and a second curved plate that is curved to be convex toward the traveling direction of the first lane in the plan view, in order from the first lane to the second lane, and is formed to be substantially S shaped in the plan view, the first curved plate and the flat plate form the concave part of the first wall surface, and the flat plate and the second curved plate form the concave part of the second wall surface. In this structure, it is possible to improve the fuel efficiency of a vehicle traveling in the first lane by utilization of natural wind blowing on the second wall surface. Likewise, it is possible to improve the fuel efficiency of a vehicle traveling in the second lane by utilization of natural wind blowing on the first wall surface.

In another aspect, the first curved plate, the flat plate, and the second curved plate are formed integrally.

In another aspect, the first curved plate, the flat plate, and the second curved plate are formed separately from one another, the first curved plate and the flat plate are arranged separately, the flat plate and the second curved plate are arranged separately, the first curved plate and the flat plate partly overlap in this order in the traveling direction of the first lane, and the flat plate and the second curved plate partly overlap in this order in the traveling direction of the first lane. Specifically, when wind that is oblique to the first lane is generated toward the traveling direction of the first lane as it flows from the second lane to the first lane, the wind passes through a gap between the flat plate and the first curved plate, is guided by the first curved plate, and the momentum in the same direction as the traveling direction of the first lane is applied. Thus, in the above structure, it is possible to suppress the structural object for the road from inhibiting the contribution of the oblique wind to the reduction of fuel consumption of the vehicle in the first lane. This is the same in the case where wind that is oblique to the second lane is generated toward the traveling direction of the second lane as it flows from the first lane to the second lane.

According to a second aspect of the present invention, a road structure includes the first lane, the second lane, and a plurality of the above-described structural objects for the road that are arranged between the first lane and the second lane at specified intervals along the first lane or the second lane.

In another aspect, the road structure includes a median strip between the first lane and the second lane, and the plurality of structural objects for the road are mounted on the median strip.

In another aspect, the road structure further includes a vertical axis wind generator placed between two adjacent ones of the plurality of structural objects for the road. In this structure, it is possible to efficiently generate electricity.

In another aspect, the road structure further includes a side wall mounted on a side of the first lane opposite to the side of the first lane on which the second lane is located, and the side wall has a plurality of inclined surfaces arranged along the first lane, and each of the inclined surfaces is inclined toward the first lane as it goes to the traveling direction of the first lane in the plan view. Specifically, wind that is generated by traveling of a leading vehicle and blows on the side wall is guided by the plurality of inclined surfaces and flows back into the first lane, maintaining the momentum in the traveling direction. In this structure, it is possible to improve the fuel efficiency of the following vehicle by utilization of the wind generated by traveling of the leading vehicle and blowing on the side wall.

In another aspect, the side wall has a depression between two adjacent ones of the inclined surfaces in the traveling direction of the first lane. In this structure, wind that is generated by traveling of a leading vehicle and blows on the side wall becomes a spiral flow and is temporarily held in the depression and then flows back into the first lane. In this structure, even when there is a rather long distance between the leading vehicle and the following vehicle, it is possible to contribute to reduction of fuel consumption of the following vehicle.

According to the aspect of the present invention, it is possible to improve the fuel efficiency of another vehicle with utilization of wind generated by traveling of a vehicle.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Embodiment

A road structure 1 according to a first embodiment is described hereinafter with reference to FIGS. 1 to 9.

Figure 1:
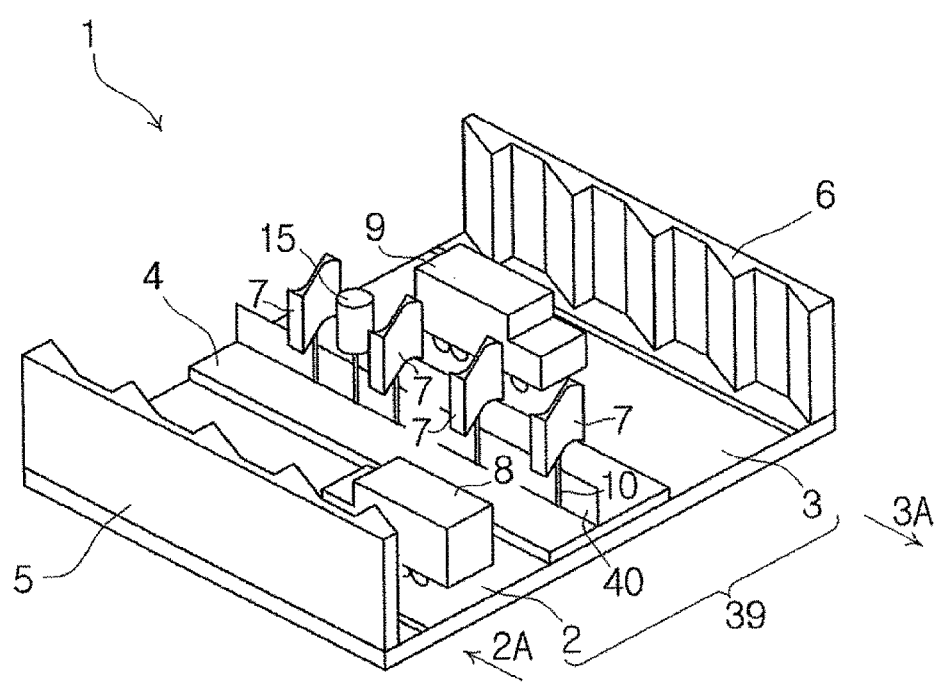
FIG. 1 is a perspective view of a road structure.
Figure 2:
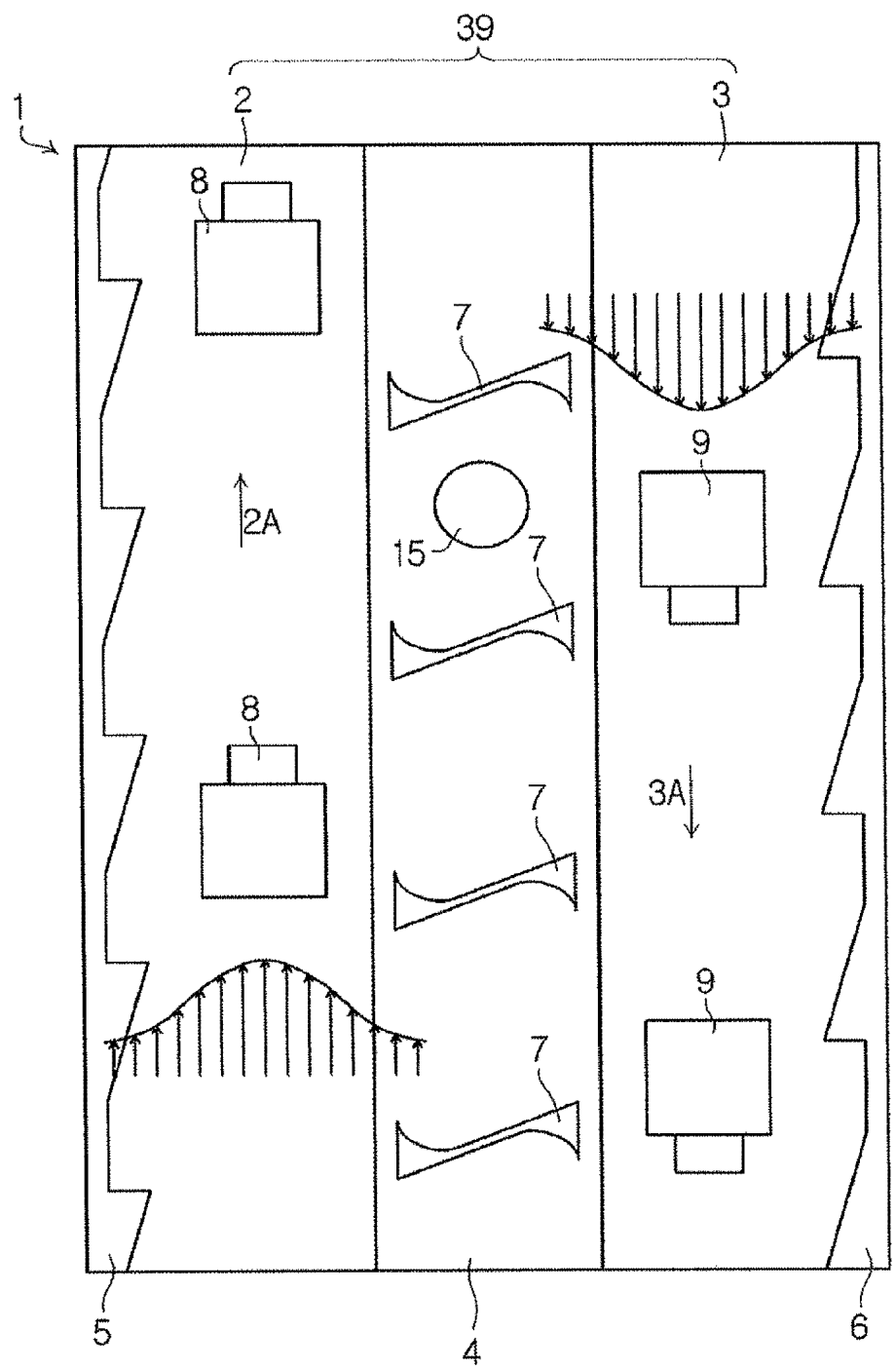
FIG. 2 is a plan view of the road structure.

As shown in FIGS. 1 and 2, the road structure 1 contains an inbound lane 2 (first lane), an outbound lane 3 (second lane), a median strip 4, an inbound side wall 5 (side wall), an outbound side wall 6 (side wall), a plurality of blades 7 (structural objects for road), a protective barrier 40, and a wind generator 15.

In the inbound lane 2, a track 8 (vehicle, subject vehicle) is traveling. The traveling direction of the inbound lane 2 is referred to as an inbound traveling direction 2A.

The outbound lane 3 is the opposite lane of the inbound lane 2. In the outbound lane 3, a track 9 (vehicle, oncoming vehicle) is traveling. The traveling direction of the outbound lane 3 is referred to as an outbound traveling direction 3A.

The inbound lane 2 and the outbound lane 3 form a roadway 39.

The median strip 4 is located between the inbound lane 2 and the outbound lane 3.

The protective barrier 40 is placed in the median strip 4. The protective barrier 40 prevents the track 8 traveling in the inbound lane 2 from crossing the median strip 4 into the outbound lane 3 due to some reason and also prevents the track 9 traveling in the outbound lane 3 from crossing the median strip 4 into the inbound lane 2 due to some reason.

The inbound side wall 5 is placed on a side of the inbound lane 2 opposite to the side of the inbound lane 2 on which the median strip 4 is located. In other words, the inbound side wall 5 is placed on a side of the inbound lane 2 opposite to the side of the inbound lane 2 on which the median the outbound lane 3 is located.

The outbound side wall 6 is placed on a side of the outbound lane 3 opposite to the side of the outbound lane 3 on which the median strip 4 is located. In other words, the outbound side wall 6 is placed on a side of the outbound lane 3 opposite to the side of the outbound lane 3 on which the inbound lane 2 is located.

Thus, the inbound side wall 5 and the outbound side wall 6 are placed with the roadway 39 located therebetween.

The plurality of blades 7 are placed between the inbound lane 2 and the outbound lane 3. Specifically, the plurality of blades 7 are placed on the median strip 4. The plurality of blades 7 are arranged at specified intervals along the inbound lane 2 or the outbound lane 3. As shown in FIG. 1, each blade 7 is fixed to the median strip 4 through a blade support shaft 10 so that it cannot rotate. Note that, the support shaft 10 mounts each blade 7 above the protective barrier 40 so as to avoid physical contact between each blade 7 and the protective barrier 40. Thus, the blade support shaft 10 can be omitted in the case where the protective barrier 40 is not built.

Figure 3:
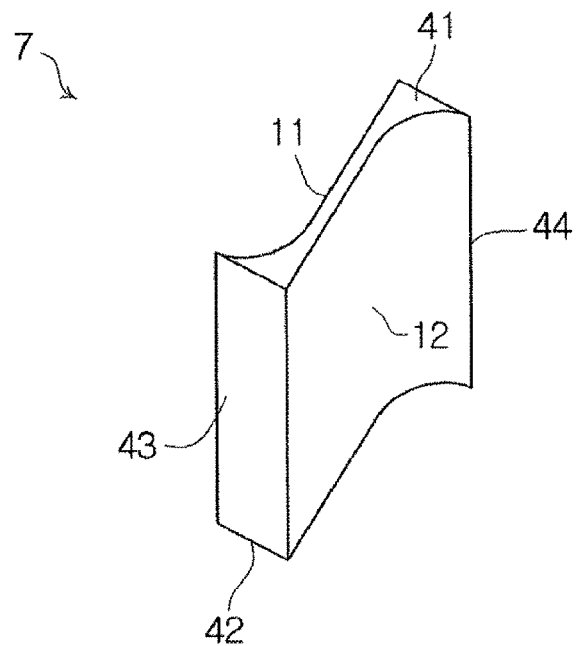
FIG. 3 is a perspective view of a blade.
Figure 4:
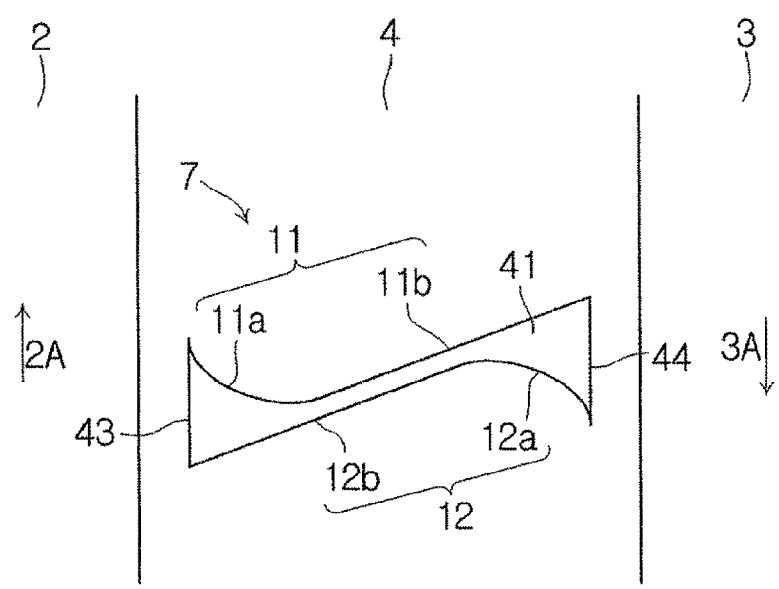
FIG. 4 is a plan view of the blade.

The blade 7 is described in detail hereinafter with reference to FIGS. 3 and 4. As shown in FIG. 3, the blade 7 is substantially plate shaped, and it is mounted vertically so that its thickness direction is in the horizontal direction. As shown in FIGS. 3 and 4, the blade 7 has an upper surface 41, a lower surface 42, an inbound side surface 43, an outbound side surface 44, a front surface 12 (second surface), and a back surface 11 (first surface).

The upper surface 41 is a horizontal surface facing upward.

The lower surface 42 is a horizontal surface facing downward.

The inbound side surface 43 is a side surface facing the inbound lane 2. The inbound side surface 43 is parallel to the inbound traveling direction 2A. The inbound side surface 43, however, is not limited to be parallel to the inbound traveling direction 2A.

The outbound side surface 44 is a side surface facing the outbound lane 3. The outbound side surface 44 is parallel to the outbound traveling direction 3A. The outbound side surface 44, however, is not limited to be parallel to the outbound traveling direction 3A.

The front surface 12 is a surface facing the same direction as the outbound traveling direction 3A.

The back surface 11 is a surface facing the same direction as the inbound traveling direction 2A.

In this embodiment, the blade 7 is formed integrally. The blade 7 is made of weather resistant resin that is resistant to UV degradation, such as Teflon (registered trademark) or acrylic (PMMA), polycarbonate (PC), or light metal, for example.

As shown in FIG. 4, the back surface 11 is concave in the plan view. To be specific, the back surface 11 is concave in the same direction as the outbound traveling direction 3A in the plan view. The back surface 11 is made up of a flat surface 11b and a curved surface 11a in order from the outbound lane 3 to the inbound lane 2. The flat surface 11b is a surface that is inclined toward the outbound traveling direction 3A as it goes from the outbound lane 3 to the inbound lane 2. The curved surface 11a is a surface that is curved to be concave in the same direction as the outbound traveling direction 3A. Thus, the curved surface 11a is curved to be convex toward the outbound traveling direction 3A. The flat surface 11b and the curved surface 11a are smoothly joined to each other.

Likewise, the front surface 12 is concave in the plan view. To be specific, the front surface 12 is concave in the same direction as the inbound traveling direction 2A in the plan view. The front surface 12 is made up of a flat surface 12b and a curved surface 12a in order from the inbound lane 2 to the outbound lane 3. The flat surface 12b is a surface that is inclined toward the inbound traveling direction 2A as it goes from the inbound lane 2 to the outbound lane 3. The curved surface 12a is a surface that is curved to be concave in the same direction as the inbound traveling direction 2A. Thus, the curved surface 12a is curved to be convex toward the inbound traveling direction 2A. The flat surface 12b and the curved surface 12a are smoothly joined to each other.

The blade 7 is formed to be symmetrical about a point in the plan view. The blade 7, however, is not limited to be formed to be symmetrical about a point in the plan view.

Figure 5:
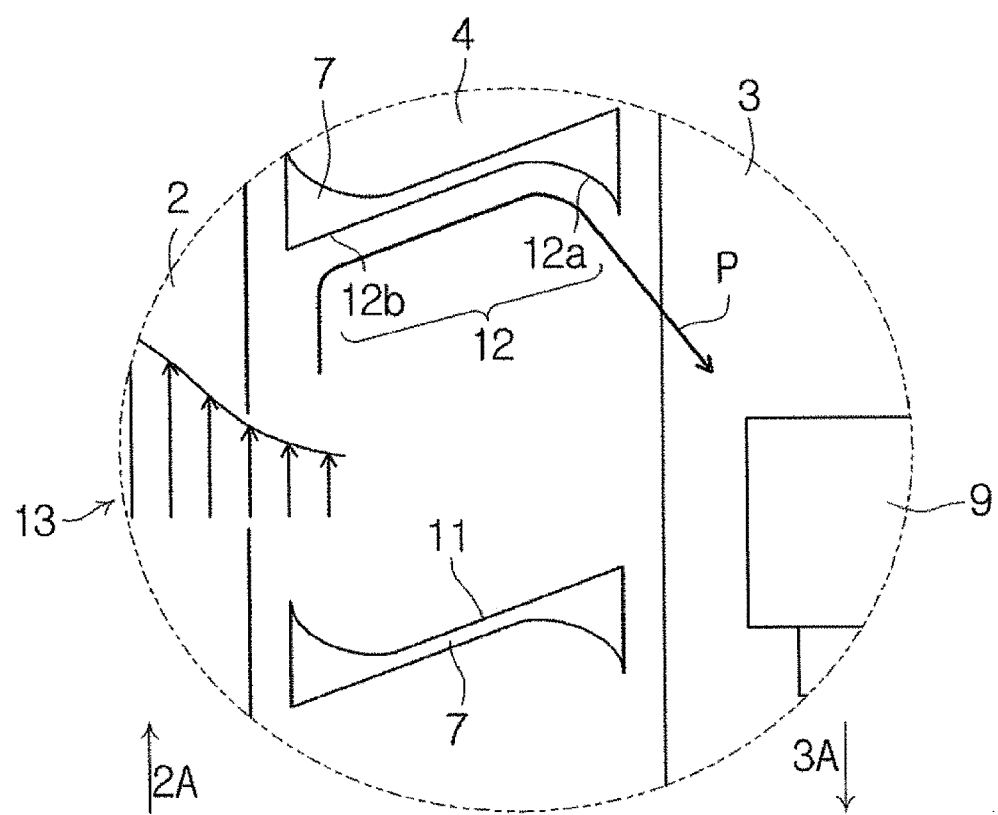
FIG. 5 is a view illustrating the operation of the blade.

The operation of the blade 7 is described hereinafter with reference to FIGS. 5 and 6. FIG. 5 shows, by a vector, the momentum of wind 13 that is generated by the track 8 traveling in the inbound lane 2. As shown in FIG. 5, the wind 13 blowing toward the outbound traveling direction 3A is generated in the rear of the track 8 traveling in the inbound lane 2. The wind 13 has a certain range, and a part of this wind blows on the front surface 12 of the blade 7 and is guided sequentially by the flat surface 12b and the curved surface 12a of the front surface 12 into the outbound lane 3. Then, the momentum in the same direction as the outbound traveling direction 3A is applied to air flow P that is away from the front surface 12 of the blade 7. It is thereby possible to improve the fuel efficiency of the track 9, which is an oncoming vehicle, with utilization of the wind 13 generated by traveling of the track 8. Further, it is possible to induce wind to blow in the traveling direction of the track 8 by the momentum of the wind 13 and thereby improve the fuel efficiency of the following vehicle as well.

Figure 6:
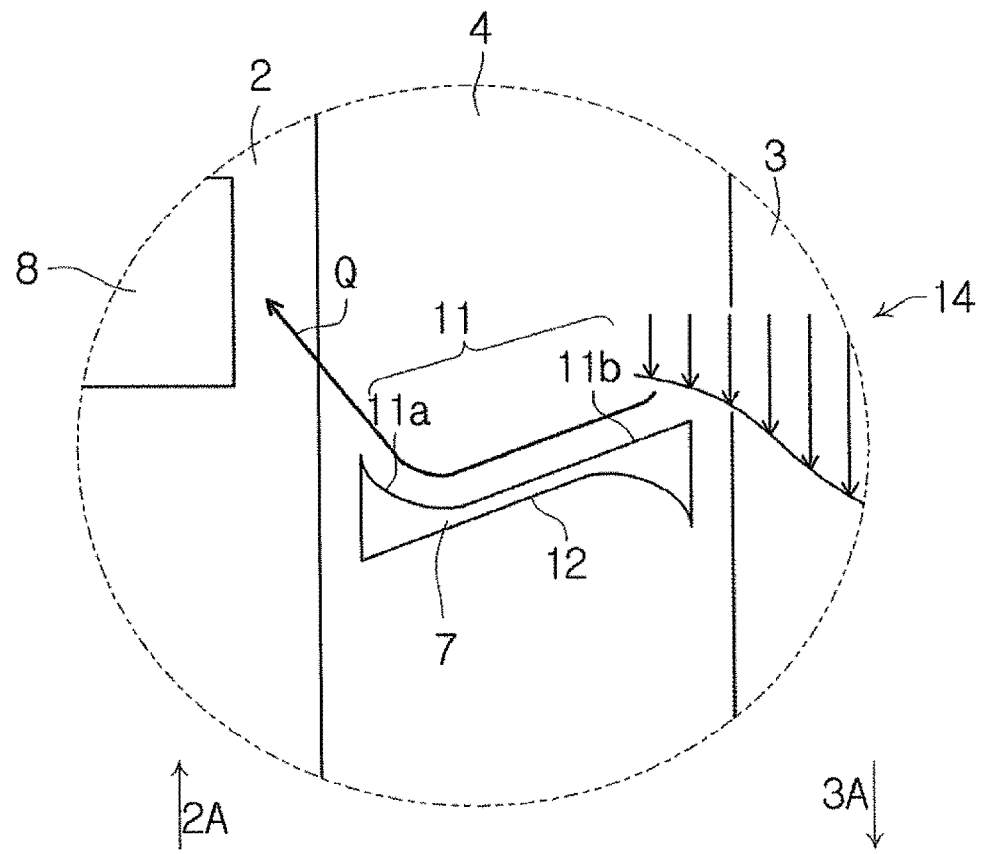
FIG. 6 is a view illustrating the operation of the blade.

Likewise, FIG. 6 shows, by a vector, the momentum of wind 14 that is generated by the track 9 traveling in the outbound lane 3. As shown in FIG. 6, the wind 14 blowing to the outbound traveling direction 3A is generated in the rear of the track 9 traveling in the outbound lane 3. The wind 14 has a certain range, and a part of the wind blows on the back surface 11 of the blade 7 and is guided sequentially by the flat surface 11b and the curved surface 11a of the back surface 11 into the inbound lane 2. Then, the momentum in the same direction as the inbound traveling direction 2A is applied to air flow Q that is away from the back surface 11 of the blade 7. It is thereby possible to improve the fuel efficiency of the track 8, which is an oncoming vehicle, with utilization of the wind 14 generated by traveling of the track 9. Further, it is possible to induce wind to blow in the traveling direction of the track 9 by the momentum of the wind 14 and thereby improve the fuel efficiency of the following vehicle as well.

Figure 7:
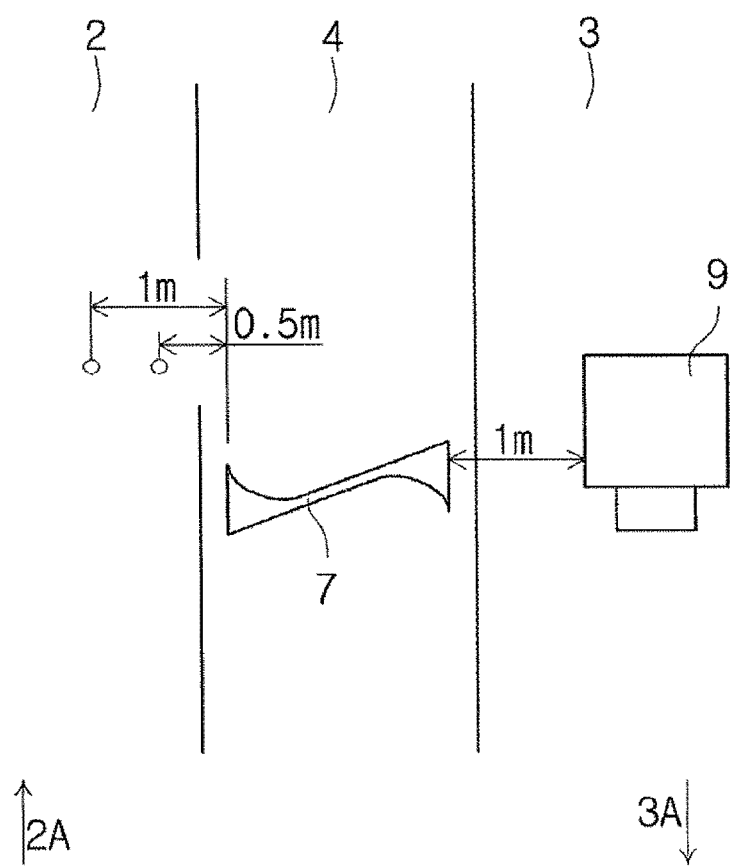
FIG. 7 is a view illustrating test conditions.
Figure 8:
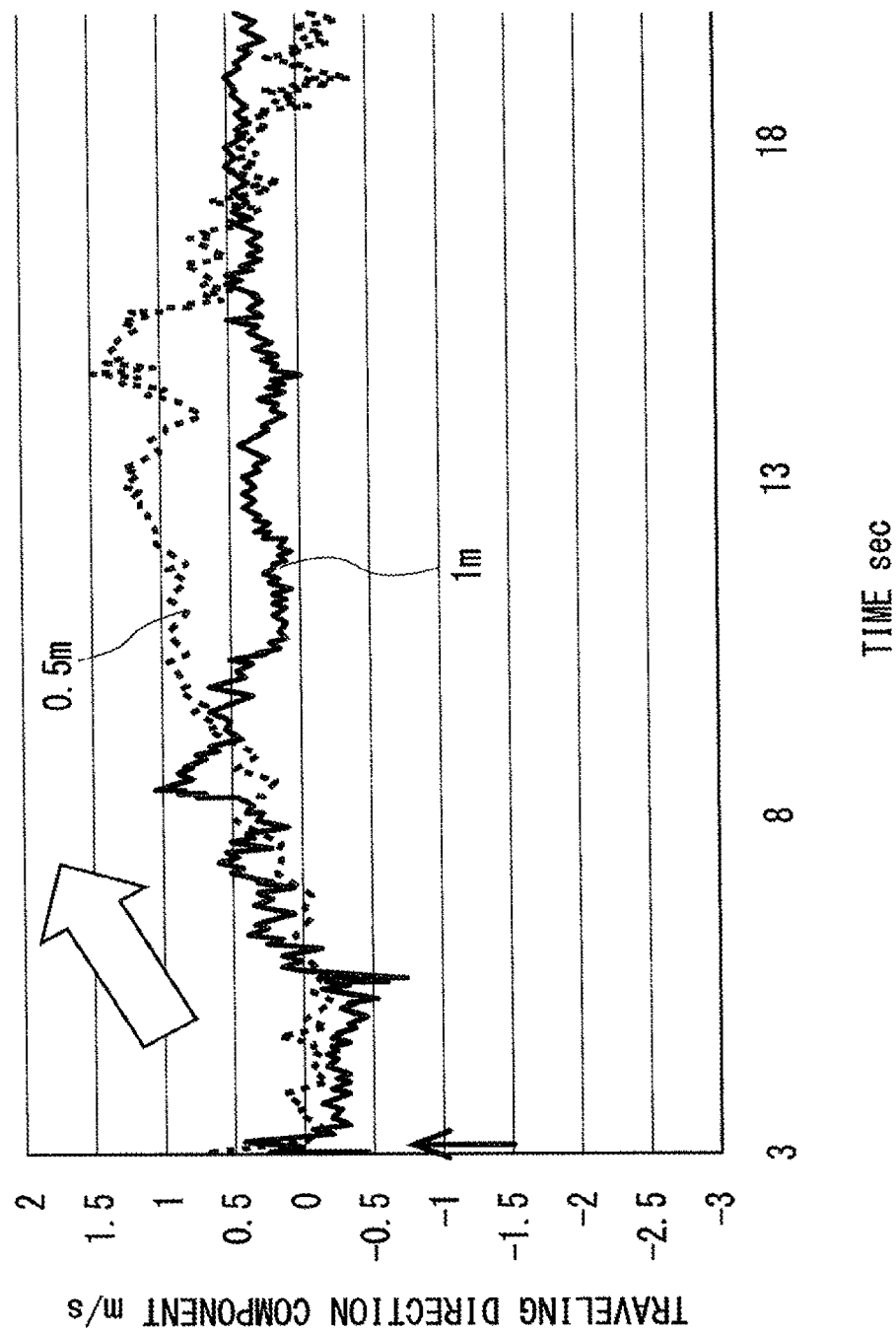
FIG. 8 is a graph showing test results when a blade is mounted.
Figure 9:
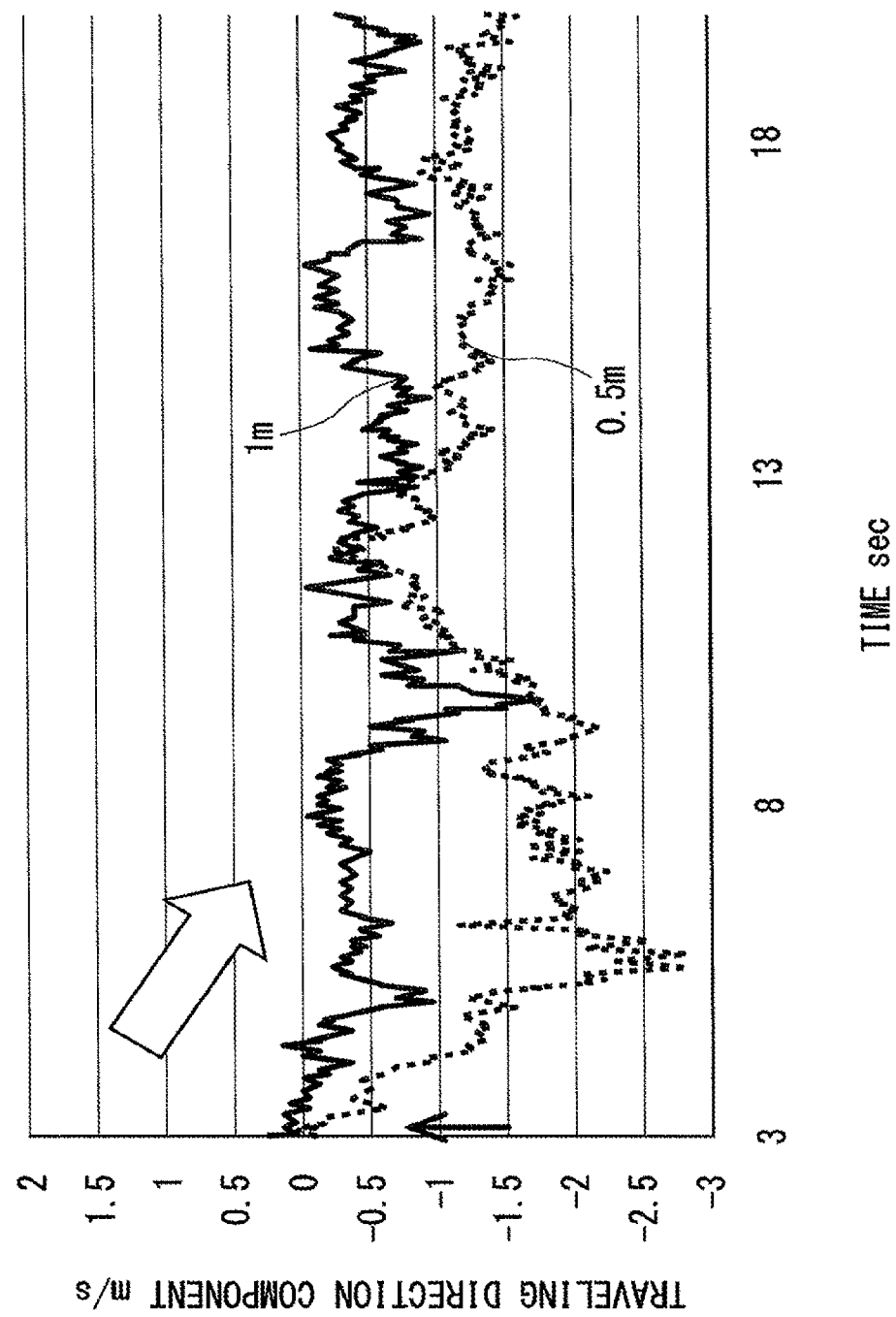
FIG. 9 is a graph showing test results when a blade is not mounted.

Hereinafter, results of a test conducted to quantitatively measure technical effects of the above-described blade 7 are reported. FIG. 7 shows test conductions of this test. In this test, the wind speed of the inbound traveling direction 2A component of wind generated in the inbound lane 2 when the track 9 travels at 100 km per hour in the outbound lane 3 is measured. The point of measurement is a point that is at 0.5 m from the blade 7 toward the inbound lane 2 and at 1 m from the ground and a point that is at 1 m from the blade 7 toward the inbound lane 2 and at 1.2 m from the ground. Note that the shortest distance between the track 9 and the blade 7 when the track 9 traveling in the outbound lane 3 passes through the blade 7 is 1 m. FIG. 8 is a graph showing test results. The horizontal axis of the graph of FIG. 8 indicates time, and the vertical axis indicates the wind speed of the inbound traveling direction 2A component at each point of measurement. Measurement results at the former point are indicated by "0.5 m" in the graph, and measurement results at the latter point are indicated by "1 m" in the graph. The up arrow in FIG. 8 indicates the time when the track 9 passes through the point of measurement. FIG. 8 shows that, when the blade 7 is mounted, wind at 1.5 m per second at maximum is generated in the inbound lane 2 along the inbound traveling direction 2A as a result that the track 9 travels in the outbound lane 3. Note that the wind in the inbound lane 2 reaches its peak 15 seconds after the track 9 passes through in the outbound lane 3. This is because wind due to pressure change is generated first, and then wind due to the wake flow blows according to the lateral distance. FIG. 9 is a graph showing test results in the case where the blade 7 is removed for comparison. The up arrow in FIG. 9 indicates the time when the track 9 passes through the point of measurement. FIG. 9 shows that, when the blade 7 is not mounted, wind at 3 m per second at maximum is generated in the inbound lane 2 along the opposite direction from the inbound traveling direction 2A as a result that the track 9 travels in the outbound lane 3.

Further, because wind at about 1 m is generated in the inbound lane 2 along the inbound traveling direction 2A, it is possible to obtain the fuel efficiency enhancement effect of about 2%. The reason is as follows.

A force acting on the track 8 traveling in the inbound lane 2 is calculated by (air resistance)×(projected area of the track 8)×(dynamic pressure). The dynamic pressure is calculated by $\frac{1}{2} \times \rho \times V^2$. V indicates the wind speed, and when the track 8 is traveling at 100 km per hour, for example, wind at 100 km per hour, which is 27.8 m per second, is blowing on the track 8. As described earlier, when wind at about 1 m per second is generated in the inbound lane 2 along the inbound traveling direction 2A, the track 8 travels with wind of 26.8 m per second blowing thereon. Accordingly, the dynamic pressure is reduced by $(27.8^2-26.8^2)/27.8^2 \times 100 = 7\%$. In general, the fuel economy increases by about 3% if the air resistance is reduced by 10%, and therefore the fuel economy increases by about 2% when the air resistance is reduced by 7%. Thus, the fuel efficiency enhancement effect of about 2% can be obtained when wind at about 1 m per second is generated in the inbound lane 2 along the inbound traveling direction 2A.

The first embodiment, which is described above, has the following advantageous effects.

The blades 7 (structural objects for road) are placed between the inbound lane 2 (first lane) and the outbound lane 3 (second lane), which is the opposite lane of the inbound lane 2. For example, as shown in FIG. 4, the blade 7 has the back surface 11 (first wall surface) facing the same direction as the inbound traveling direction 2A and the front surface 12 (second wall surface) facing the same direction as the outbound traveling direction 3A. As shown in FIG. 6, the back surface 11 is concave in the same direction as the outbound traveling direction 3A so as to change wind blowing from the outbound lane 3 into wind having a component in the inbound traveling direction 2A. The front surface 12 is concave in the same direction as the inbound traveling direction 2A so as to change wind blowing from the inbound lane 2 into wind having a component in the outbound traveling direction 3A. In the above-described structure, it is possible to improve the fuel efficiency of the track 9 (or the track 8) with utilization of the wind 13 (or the wind 14) generated by traveling of the track 8 (or the track 9) as shown in FIGS. 5 and 6.

Note that, although the entire back surface 11 is concave in the same direction as the outbound traveling direction 3A in the above-described first embodiment, only a part of the back surface 11 may be concave in the same direction as the outbound traveling direction 3A. In other words, the back surface 11 only needs to have a concave part that is concave in the same direction as the outbound traveling direction 3A. Likewise, although the entire front surface 12 is concave in the same direction as the inbound traveling direction 2A in the above-described first embodiment, only a part of the front surface 12 may be concave in the same direction as the inbound traveling direction 2A. In other words, the front surface 12 only needs to have a concave part that is concave in the same direction as the inbound traveling direction 2A.

Further, the back surface 11 contains the flat surface 11b and the curved surface 11a in order from the outbound lane 3 to the inbound lane 2. The front surface 12 contains the flat surface 12b and the curved surface 12a in order from the inbound lane 2 to the outbound lane 3. In the above-described structure, it is possible to change wind blowing from the outbound lane 3 into wind having a component in the inbound traveling direction 2A more efficiently than the case where the back surface 11 is made up of a combination of a plurality of flat surfaces. Likewise, in the above-described structure, it is possible to change wind blowing from the inbound lane 2 into wind having a component in the outbound traveling direction 3A more efficiently than the case where the front surface 12 is made up of a combination of a plurality of flat surfaces.

Note that, although the blade 7 that is formed integrally has the back surface 11 and the front surface 12 in the above-described first embodiment, the blade 7 may be composed of two parts: a part having the back surface 11 and a part having the front surface 32. Those two parts may be coupled together or may be separated from each other.

Second Embodiment

Figure 10:
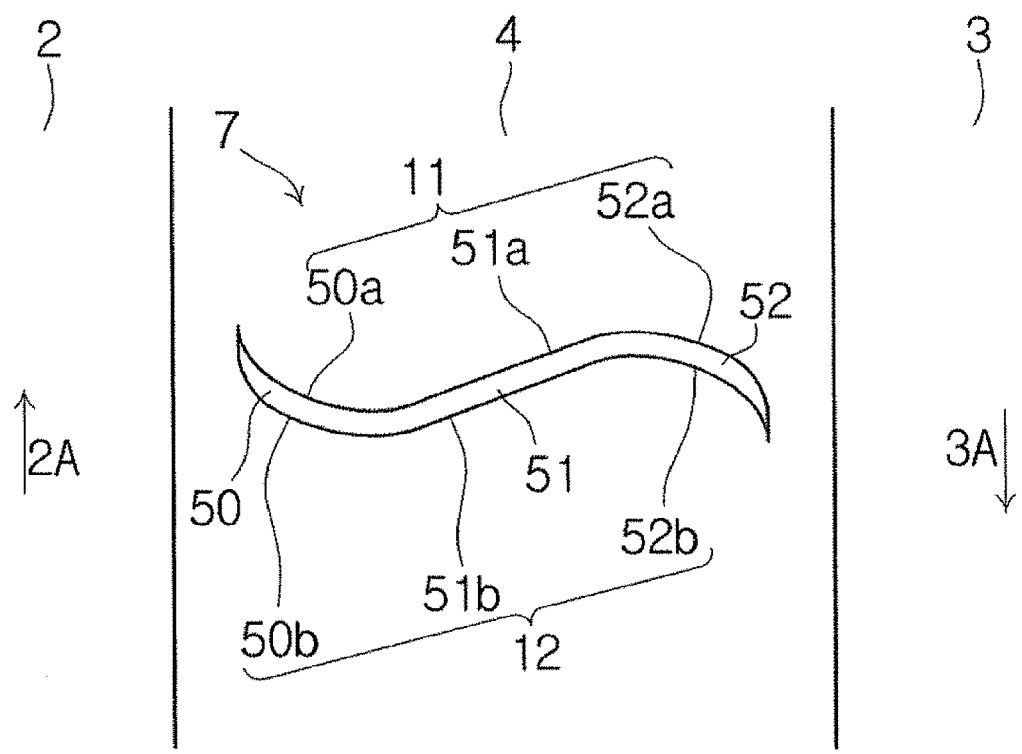
FIG. 10 is a plan view of a blade according to a second embodiment.
Figure 11:
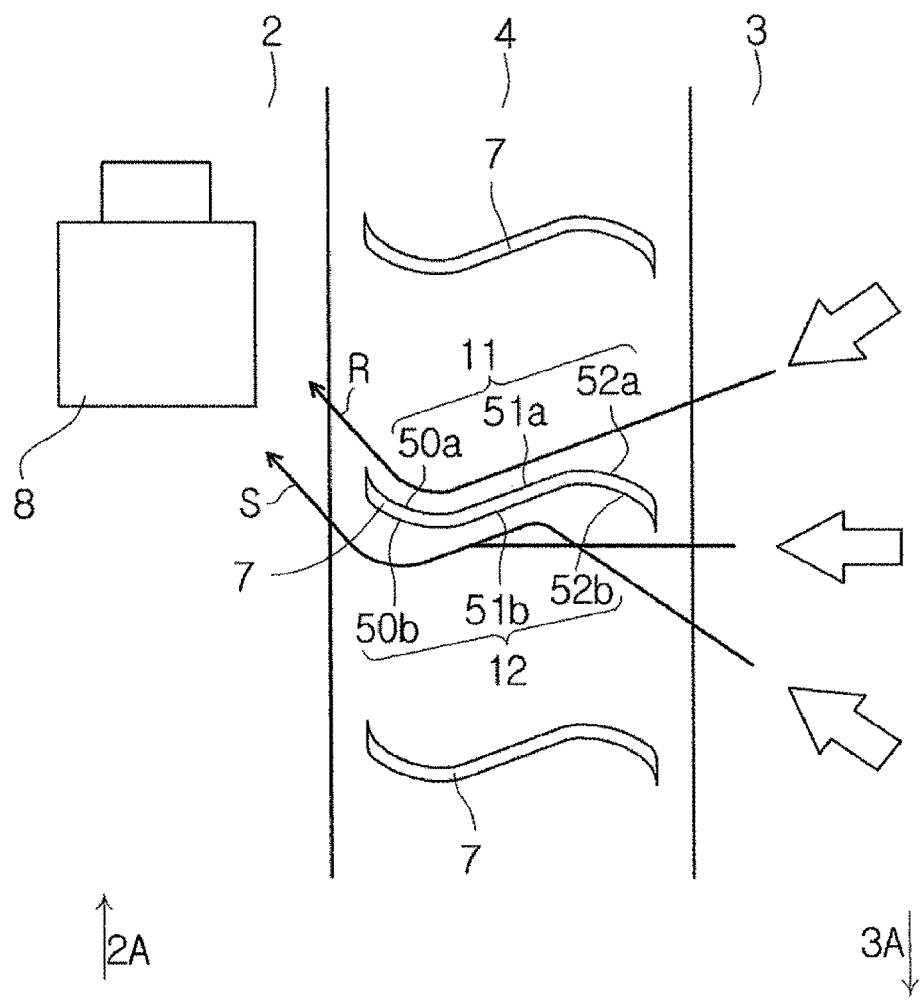
FIG. 11 is a view illustrating the operation of the blade.

A second embodiment is described hereinafter with reference to FIGS. 10 and 11. Differences of this embodiment from the above-described first embodiment are mainly described hereinafter, and the redundant description is omitted. As shown in FIG. 10, the blade 7 has a first curved plate 50 that is curved to be convex toward the outbound traveling direction 3A in the plan view, a flat plate 51 that is inclined toward the inbound traveling direction 2A in the plan view as it goes from the inbound lane 2 to the outbound lane 3, and a second curved plate 52 that is curved to be convex toward the inbound traveling direction 2A in the plan view, in order from the inbound lane 2 to the outbound lane 3 in this embodiment. Thus, the blade 7 is formed to be substantially S shaped in the plan view.

The first curved plate 50 has a curved surface 50a facing the inbound traveling direction 2A and a curved surface 50b facing the outbound traveling direction 3A. The curved surface 50a and the curved surface 50b are both curved to be convex toward the outbound traveling direction 3A.

The flat plate 51 has a flat surface 51a facing the inbound traveling direction 2A and a flat surface 51b facing the outbound traveling direction 3A. The flat surface 51a and the flat surface 51b are both flat surfaces.

The second curved plate 52 has a curved surface 52a facing the inbound traveling direction 2A and a curved surface 52b facing the outbound traveling direction 3A. The curved surface 52a and the curved surface 52b are both curved to be convex toward the inbound traveling direction 2A.

A back surface 11 is composed of the curved surface 50a, the flat surface 51a and the curved surface 52a.

A front surface 12 is composed of the curved surface 50b, the flat surface 51b and the curved surface 52b.

The first curved plate 50 and the flat plate 51 form a concave part of the back surface 11 that is concave in the same direction as the outbound traveling direction 3A. Specifically, the curved surface 50a and the flat surface 51a of the back surface 11 are concave in the same direction as the outbound traveling direction 3A.

Likewise, the flat plate 51 and the second curved plate 52 form a concave part of the front surface 12 that is concave in the same direction as the inbound traveling direction 2A. Specifically, the flat surface 51b and the curved surface 52b of the front surface 12 are concave in the same direction as the inbound traveling direction 2A.

In this embodiment, the first curved plate 50, the flat plate 51 and the second curved plate 52 are formed integrally. The blade 7 is formed to be symmetrical about a point in the plan view. The blade 7, however, is not limited to be formed to be symmetrical about a point in the plan view.

The operation of the blade 7 is described hereinafter with reference to FIG. 11.

When natural wind that blows toward the outbound traveling direction 3A as it flows from the outbound lane 3 to the inbound lane 2 is generated, the wind blows on the back surface 11, is guided sequentially by the flat surface 51a and the curved surface 50a into the inbound lane 2. Then, the momentum in the same direction as the inbound traveling direction 2A is applied to air flow R that is away from the blade 7. It is thereby possible to improve the fuel efficiency of the track 8 with utilization of natural wind that blows toward the outbound traveling direction 3A as it flows from the outbound lane 3 to the inbound lane 2.

Further, when natural side wind that blows from the outbound lane 3 to the inbound lane 2 is generated, the side wind blows on the front surface 12, is guided sequentially by the flat surface 51b and the curved surface 50b into the inbound lane 2. Then, the momentum in the same direction as the inbound traveling direction 2A is applied to air flow S that is away from the blade 7. It is thereby possible to improve the fuel efficiency of the track 8 with utilization of natural side wind that blows from the outbound lane 3 to the inbound lane 2.

Further, when natural wind that blows toward the inbound traveling direction 2A as it flows from the outbound lane 3 to the inbound lane 2 is generated, the wind blows on the front surface 12, is guided sequentially by the flat surface 51b and the curved surface 50b into the inbound lane 2. Then, the momentum in the same direction as the inbound traveling direction 2A is applied to air flow S that is away from the blade 7. It is thereby possible to improve the fuel efficiency of the track 8 with utilization of natural wind that blows toward the inbound traveling direction 2A as it flows from the outbound lane 3 to the inbound lane 2.

The same effect is exerted for natural wind that blows from the inbound lane 2 to the outbound lane 3.

The second embodiment, which is described above, has the following advantageous effects.

For example, as shown in FIG. 10, the blade 7 (structural object for the road) has the first curved plate 50 that is curved to be convex toward the outbound traveling direction 3A in the plan view, the flat plate 51 that is inclined toward the inbound traveling direction 2A in the plan view as it goes from the inbound lane 2 to the outbound lane 3, and the second curved plate 52 that is curved to be convex toward the inbound traveling direction 2A in the plan view, in order from the inbound lane 2 (first lane) to the outbound lane 3 (second lane), and therefore the blade 7 is formed to be substantially S shaped in the plan view. The first curved plate 50 and the flat plate 51 form a concave part of the back surface 11 (first wall surface), and the flat plate 51 and the second curved plate 52 form a concave part of the front surface 12 (second wall surface). In the above-described structure, it is possible to improve the fuel efficiency of the track 8 traveling in the inbound lane 2 by utilization of natural wind blowing on the front surface 12. Likewise, it is possible to improve the fuel efficiency of the track 9 traveling in the outbound lane 3 by utilization of natural wind blowing on the back surface 11.

Further, the first curved plate 50, the flat plate 51 and the second curved plate 52 are formed integrally. In the above-described structure, it is possible to manufacture the blade 7 at low costs.

Figure 12:
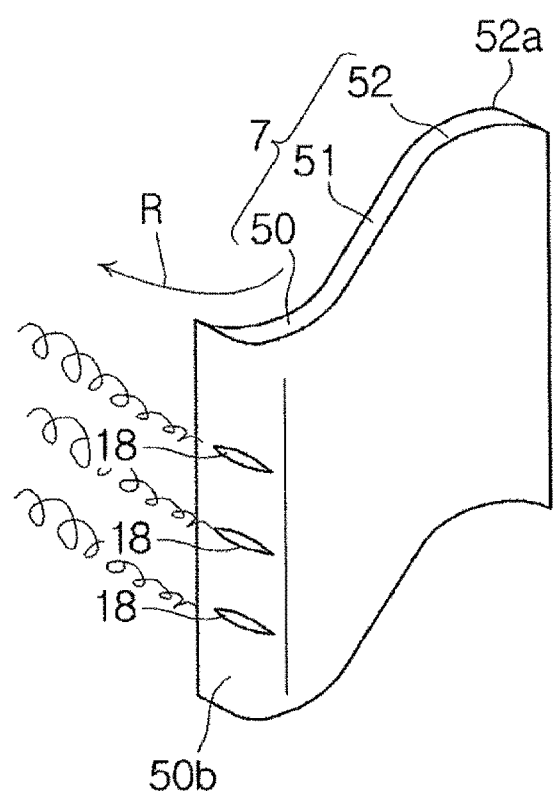
FIG. 12 is a view illustrating the operation of a blade according to an alternative example.

Note that, as shown in FIG. 12, the curved surface 50h of the first curved plate 50 of the blade 7 may have a plurality of ridges 18 extending horizontally. In the above-described structure, an eddy is generated from each ridge 18 toward the inbound traveling direction 2A, which pulls the current R (see FIG. 11 also) with a negative pressure, and it is thereby possible to enhance the wind speed of the inbound traveling direction 2A component of the flow R. Likewise, the curved surface 52a of the second curved plate 5 of the blade 7 may have a plurality of ridges extending horizontally.

Third Embodiment

A third embodiment is described hereinafter with reference to FIG. 13. Differences of this embodiment from the above-described second embodiment are mainly described hereinafter, and the redundant description is omitted.

In the above-described second embodiment, the blade 7 contains the first curved plate 50, the flat plate 51 and the second curved plate 52, and the first curved plate 50, the flat plate 51 and the second curved plate 52 are formed integrally as shown in FIG. 10.

Figure 13:
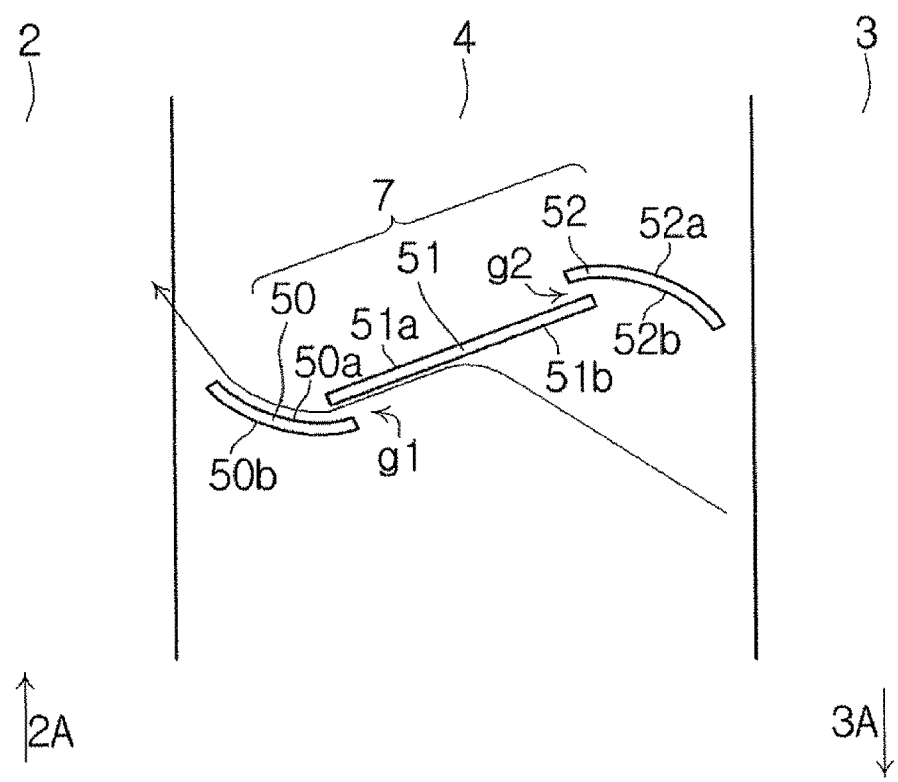
FIG. 13 is a plan view of a blade according to a third embodiment.

On the other hand, in this embodiment, the first curved plate 50, the flat plate 51 and the second curved plate 52 are formed separately from one another as shown in FIG. 13. Specifically, the first curved plate 50 and the flat plate 51 are arranged separately from each other. The flat plate 51 and the second curved plate 52 are arranged separately from each other. In the inbound traveling direction 2A, the first curved plate 50 and the flat plate 51 partly overlap in this order. In the inbound traveling direction 2A, the first curved plate 50 and the flat plate 51 partly face each other. There is a gap g1 between the first curved plate 50 and the flat plate 51. In the inbound traveling direction 2A, the flat plate 51 and the second curved plate 52 partly overlap in this order. In the inbound traveling direction 2A, the flat plate 51 and the second curved plate 52 partly face each other, There is a gap g2 between the flat plate 51 and the second curved plate 52.

The operation of the blade 7 is described hereinafter. As shown in FIG. 13, when natural wind that is oblique to the inbound lane 2 is generated toward the inbound traveling direction 2A as it flows from the outbound lane 3 to the inbound lane 2, the wind blows on the flat surface 51b of the flat plate 51, passes through the gap g1 between the flat plate 51 and the first curved plate 50, is guided by the curved surface 50a of the first curved plate 50, and the momentum in the same direction as the inbound traveling direction 2A is applied to the wind. Thus, in the above-described structure, it is possible to suppress the blade 7 from inhibiting the contribution of the oblique wind to the reduction of fuel consumption of the track 8 in the inbound lane 2. This is the same in the case where natural wind that is oblique to the outbound lane 3 is generated toward the outbound traveling direction 3A as it flows from the inbound lane 2 to the outbound lane 3.

(Inbound Side Wall 5)

Figure 14:
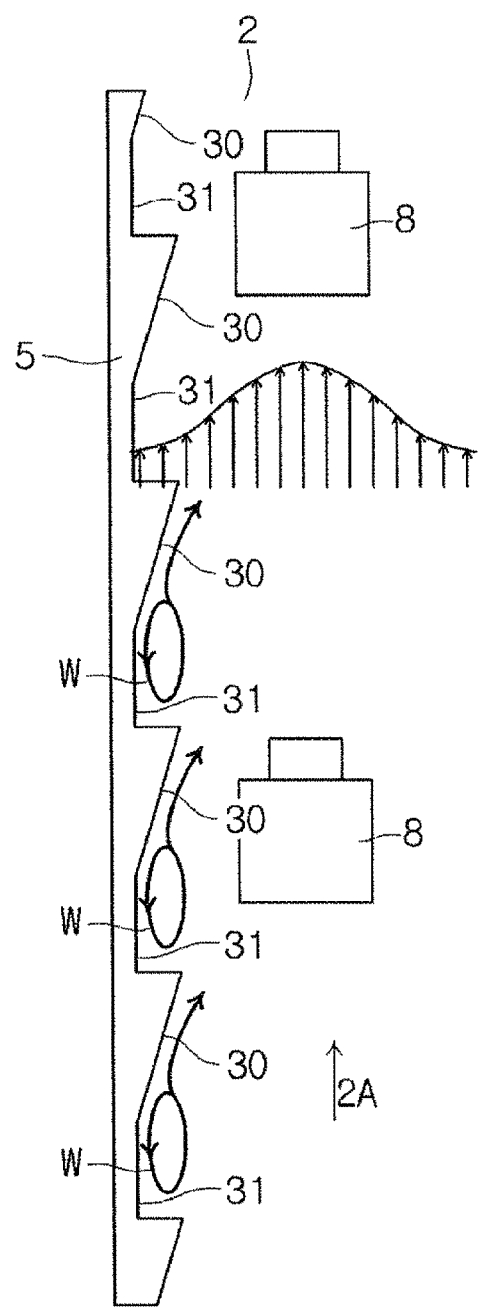
FIG. 14 is a view illustrating the operation of an inbound side wall.

The inbound side wall 5 is described hereinafter with reference to FIG. 14. As shown in FIG. 14, the inbound side wall 5 has a plurality of inclined surfaces 30 arranged along the inbound lane 2. Each inclined surface 30 is inclined toward the inbound lane 2 as it goes toward the inbound traveling direction 2A in the plan view.

Wind that is generated by traveling of the track 8, which is a leading vehicle, and blows on the inbound side wall 5 is guided by the plurality of inclined surfaces 30, and thereby the wind flows back into the inbound lane 2, maintaining the momentum in the inbound traveling direction 2A. Thus, in the above-described structure, it is possible to improve the fuel efficiency of the track 8, which is the following vehicle, by utilization of the wind generated by traveling of the track 8, which is the leading vehicle, and blowing on the inbound side wall 5.

The outbound side wall 6, like the inbound side wall 5, has a plurality of inclined surfaces arranged along the outbound lane 3. Each inclined surface is inclined toward the outbound lane 3 as it goes toward the outbound traveling direction 3A in the plan view.

Further, the inbound side wall 5 has a depression 31 between the two adjacent inclined surfaces 30 in the inbound traveling direction 2A. In the above-described structure, wind that is generated by traveling of the track 8, which is a leading vehicle, and blows on the inbound side wall 5 becomes a spiral flow W that is counterclockwise in the plan view, and it is temporarily held in the depression 31 and then flows back into the inbound lane 2. Thus, in the above-described structure, even when there is a rather long distance between the track 8, which is the leading vehicle, and the track 8, which is the following vehicle, it is possible to contribute to reduction of fuel consumption of the track 8, which is the following vehicle. The same applies to the outbound side wall 6.

(Wind Generator 15)

The wind generator 15 is described hereinafter. As shown in FIG. 1, the wind generator 15 is placed between the two adjacent blades 7. As shown in FIGS. 5 and 6, in the space between the two adjacent blades 7, air flow generated by traveling of the track 8 and air flow generated by traveling of the track 9 are both clockwise in the plan view. Thus, by placing the vertical axis wind generator 15 between the two adjacent blades 7, it is possible to efficiently generate electricity.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A structural object for road to be mounted between a first lane and a second lane being an opposite lane of the first lane, comprising:
   a first wall surface facing the same direction as a traveling direction of the first lane; and
   a second wall surface facing the same direction as a traveling direction of the second lane, the second wall surface being an opposite surface of the first wall surface, wherein
   the first wall surface has only one concave part that is formed over the entire first wall surface, and is concave in the same direction as the traveling direction of the second lane in order to change wind blowing from the second lane into wind having a component of the traveling direction of the first lane, and
   the second wall surface has only one concave part that is formed over the entire second wall surface, and is concave in the same direction as the traveling direction of the first lane in order to change wind blowing from the first lane into wind having a component of the traveling direction of the second lane.

2. The structural object for the road according to claim 1, wherein
   the first wall surface contains a flat surface and a curved surface in order from the second lane to the first lane, and
   the second wall surface contains a flat surface and a curved surface in order from the first lane to the second lane.

3. A road structure comprising:
   the first lane;
   the second lane; and
   a plurality of structural objects for the road according to claim 1 that are arranged between the first lane and the second lane at specified intervals along the first lane or the second lane.

4. The road structure according to claim 3, comprising:
   a median strip between the first lane and the second lane, wherein
   the plurality of structural objects for the road are mounted on the median strip.

5. The road structure according to claim 3, further comprising:
   a wind generator which generates electricity placed between two adjacent ones of the plurality of structural objects for the road.

6. The road structure according to claim 3, further comprising:
   a side wall mounted on a side of the first lane opposite to the side of the first lane on which the second lane is located, wherein
   the side wall has a plurality of inclined surfaces arranged along the first lane, and
   each of the inclined surfaces is inclined toward the first lane in the plan view as it goes to the traveling direction of the first lane.

7. The road structure according to claim 6, wherein
   the side wall has a depression between two adjacent ones of the inclined surfaces in the traveling direction of the first lane.

8. A structural object for road to be mounted between a first lane and a second lane being an opposite lane of the first lane, comprising:
   a first wall surface facing the same direction as a traveling direction of the first lane; and
   a second wall surface facing the same direction as a traveling direction of the second lane, wherein
   the first wall surface has a concave part that is concave in the same direction as the traveling direction of the second lane in order to change wind blowing from the second lane into wind having a component of the traveling direction of the first lane,
   the second wall surface has a concave part that is concave in the same direction as the traveling direction of the first lane in order to change wind blowing from the first lane into wind having a component of the traveling direction of the second lane,
   the structural object has a first curved plate that is curved to be convex toward the traveling direction of the second lane in a plan view, a flat plate that is inclined toward the traveling direction of the first lane in the plan view as it goes from the first lane to the second lane, and a second curved plate that is curved to be convex toward the traveling direction of the first lane in the plan view, in order from the first lane to the second lane, and is formed to be substantially S shaped in the plan view,
   the first curved plate and the flat plate form the concave part of the first wall surface, and
   the flat plate and the second curved plate form the concave part of the second wall surface.

9. The structural object for the road according to claim 8, wherein
   the first curved plate, the flat plate, and the second curved plate are formed integrally.

10. The structural object for the road according to claim 8, wherein
    the first curved plate, the flat plate, and the second curved plate are formed separately from one another,
    the first curved plate and the flat plate are arranged separately,
    the flat plate and the second curved plate are arranged separately,
    the first curved plate and the flat plate partly overlap in this order in the traveling direction of the first lane, and
    the flat plate and the second curved plate partly overlap in this order in the traveling direction of the first lane.

11. A road structure comprising:
    the first lane;
    the second lane; and
    a plurality of structural objects for the road according to claim 3 that are arranged between the first lane and the second lane at specified intervals along the first lane or the second lane.

12. The road structure according to claim 11, comprising:
    a median strip between the first lane and the second lane, wherein
    the plurality of structural objects for the road are mounted on the median strip.

13. The road structure according to claim 11, further comprising:

a wind generator which generates electricity placed between two adjacent ones of the plurality of structural objects for the road.

14. The road structure according to claim 11, further comprising:
a side wall mounted on a side of the first lane opposite to the side of the first lane on which the second lane is located, wherein
the side wall has a plurality of inclined surfaces arranged along the first lane, and
each of the inclined surfaces is inclined toward the first lane in the plan view as it goes to the traveling direction of the first lane.

15. The road structure according to claim 14, wherein the side wall has a depression between two adjacent ones of the inclined surfaces in the traveling direction of the first lane.

* * * * *